United States Patent [19]

Sarraf

[11] Patent Number: 4,958,098
[45] Date of Patent: Sep. 18, 1990

[54] ROTARY DEVICE

[75] Inventor: Sanwal P. Sarraf, Rochester, N.Y.

[73] Assignee: Eastman Kodak Company, Rochester, N.Y.

[21] Appl. No.: 123,836

[22] Filed: Nov. 23, 1987

Related U.S. Application Data

[63] Continuation-in-part of Ser. No. 942,120, Dec. 16, 1986, abandoned.

[51] Int. Cl.[5] .............................................. H02K 21/12
[52] U.S. Cl. ...................................... 310/156; 310/90; 310/90.5; 310/179; 310/268; 310/DIG. 6; 384/123
[58] Field of Search ............... 310/90.5, 90, 261, 254, 310/268, 177, 181, 156, 179, 180, 184, 208, DIG. 6; 384/123; 324/146

[56] References Cited

U.S. PATENT DOCUMENTS

| | | | |
|---|---|---|---|
| 3,891,282 | 6/1975 | Tuffias | 384/123 UX |
| 4,128,280 | 12/1978 | Purtschert | 310/90.5 UX |
| 4,332,428 | 6/1982 | Maruyama | 310/90.5 |
| 4,366,405 | 12/1982 | Schmider | 310/268 |
| 4,413,895 | 11/1983 | Lee | 310/268 |
| 4,512,626 | 4/1985 | Kamiya | 350/6.8 |
| 4,558,909 | 12/1985 | Stauber | 384/123 |
| 4,658,162 | 4/1987 | Koyama | 310/DIG. 6 |
| 4,726,640 | 2/1988 | Iwama | 310/90.5 |
| 4,805,972 | 2/1989 | Tanaka | 310/90 |
| 4,820,949 | 4/1989 | Mizobuchi | 310/90 |

FOREIGN PATENT DOCUMENTS

| | | | |
|---|---|---|---|
| 0134220 | 8/1983 | Japan | 384/123 |
| 6902851 | 8/1970 | Netherlands | 384/123 |

Primary Examiner—R. Skudy
Attorney, Agent, or Firm—Donald D. Schaper

[57] ABSTRACT

A rotary device is disclosed for use as a precision element such as an optical scanner. The device comprises a rotor which includes a driven element such as a polygon having a plurality of mirror surfaces thereon, an arrangement for supporting the rotor for rotational movement, and a drive motor for the rotor. The rotor supporting arrangement includes a thrust bearing. In order to provide a rotary device having a low profile and a minimum of parts, a planar motor is used as the drive motor, and the permanent magnet of the motor is incorporated in the rotor. The thrust bearing includes an arrangement for directing an axial force against a radial surface of the rotor when the motor is actuated.

10 Claims, 2 Drawing Sheets

ROTARY DEVICE

This application is a continuation-in-part application of U.S. Application, Ser. No. 942,120, filed Dec. 16, 1986, now abandoned.

FIELD OF THE INVENTION

The present invention relates to a rotary device, and more particularly, to such a device for supporting and driving a precision element such as an optical scanner.

DESCRIPTION OF THE ART

Certain types oF optical scanners include polygon mirrors which are operated at high speeds, for example, in excess of 10,000 rpm. When these scanners are used in applications such as laser printers, the speed of the polygon mirror must be controlled within very narrow limits, and the mirror must be supported for vibration free movement. In order to provide stable, low friction supports for the mirrors, various types of bearings have been used, including air bearings.

One example of a bearing arrangement for a mirror scanner is shown in U.S. Pat. No. 4,512,626, to Kamiya et al. The Kamiya et al. patent discloses a polygon mirror fixed to a spindle which is rotatably supported in a scanner housing. The spindle is radially supported by two bearings of a dynamic pressure type, and is axially supported by a magnetic thrust bearing. A rotor magnet for the scanner drive motor is carried on the spindle. One of the main problems with the bearing and drive arrangement disclosed in the patent is that it makes the scanner too large and complex for many applications.

It is also known in the art to form herringbone grooves in the spindle of an optical scanner to serve as an air bearing. However, this type of bearing requires a relatively long spindle which increases the height of the scanner and also introduces problems in maintaining the dynamic balance of the scanner.

SUMMARY OF THE INVENTION

It is an object of the present invention to overcome the problems in the prior art described above and to provide a rotary device having an improved support and drive means.

In accordance with one aspect of the invention, there is provided a rotary device comprising: a rotor which includes a first element of a planar motor, the rotor including a radially extending thrust surface; means for supporting the rotor for rotational movement, the supporting means including a second element of a planar motor, one of the elements being a motor coil and the other element being a magnet which is adapted to interact with a field produced by the coil to drive the rotor, the supporting means having a radially extending bearing surface arranged opposite the thrust surface; and means on one of the radially extending surfaces for receiving a fluid upon rotation of the rotor and for controlling the fluid such that the fluid exerts an axial force on the rotor.

In one embodiment of the present invention, the rotary device of the present invention is in the form of an optical scanner which comprises a polygon having a plurality of mirror surfaces. The polygon is supported on a rotor which is mounted for rotation on a spindle. The rotor is driven by a planar motor, and parts oF the motor are incorporated in the rotor. The rotor is supported in an axial direction by an air bearing.

The rotary device of the present invention has a low profile which makes it particularly suitable for certain applications, for example, for use as an optical scanner in laser printers. The reduction in the overall height of the device is accomplished through the use of a planar motor and the incorporation of an air thrust bearing which is operable on a radial surface of the rotor. As a result of this arrangement, the device is considerably simplified and is thus relatively inexpensive to manufacture.

Other features and advantages will become apparent from reference to the following Description of the Preferred Embodiment when read in light of the attached drawings.

DESCRIPTION OF THE PREFERRED EMBODIMENT

Figure 1:
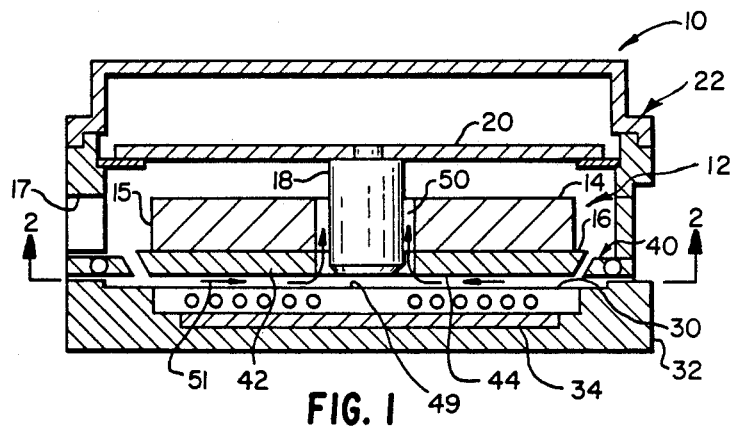
FIG. 1 is an elevational view, with parts shown in section, of one embodiment of the present invention.

With reference to FIG. 1, there is shown an illustration of a rotary device of the present invention in the form of an optical scanner 10. Scanner 10 comprises a rotor 12 which includes a polygon 14 and a permanent magnet 16. Rotor 12 is supported for rotation on a spindle 18 which is mounted in a support plate 20 fixed to a housing 22 of the scanner 10.

Polygon 14 comprises a plurality of scanner surfaces in the form of mirror surfaces 15. When polygon 14 is rotated, an input light beam is directed to the mirror surfaces 15 through a window 17, and an output light beam from surfaces 15 is scanned across a receiving medium (not shown). Scanner 10 could be used, for example, in a device such as a laser printer (not shown) to scan a modulated light beam across a photosensitive surface.

A generally planar coil 30 is mounted in a lower portion 32 of housing 22, and the coil 30 rests on a flux plate 34. When a current is supplied to coil 30, magnet 16 interacts with a rotary field produced by coil 30 to function as a motor to drive the polygon 14.

The motor formed by magnet 16, coil 30, and flux plate 34 can be of a planar type well known in the art. The motor can be a brushless D.C. motor in which Hall sensors (not shown) are used for controlling the commutation of current. For such a motor, magnet 16 could be a multipolar permanent magnet, and coil 30 could be in the form of a coreless stator having a plurality of coil elements arranged on opposite sides of a dielectric sheet. Further, coil 30 could be formed by printed circuit techniques. One example of a motor of this type is shown in U.S. Pat. No. 4,413,895, granted Nov. 8, 1983.

Figure 2:
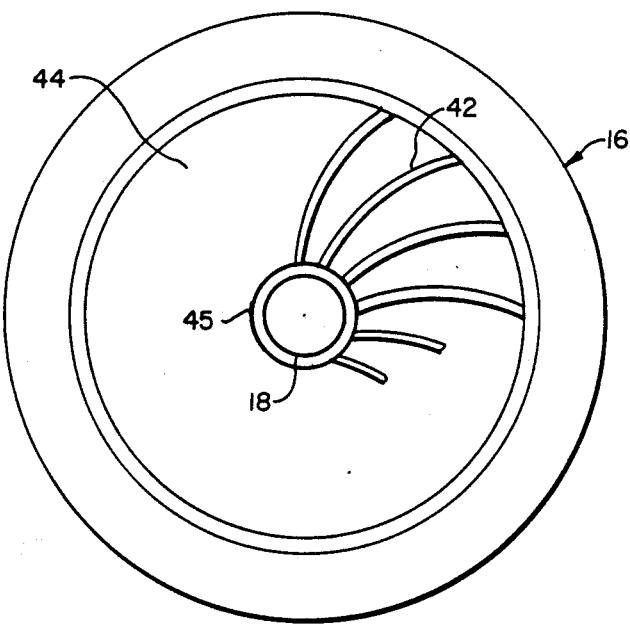
FIG. 2 is a sectional view, taken on line 2—2 of FIG. 1.

A ball bearing 40, mounted in housing 22, supports rotor 12 when the rotor is at rest. When the rotor 12 is being driven, an air thrust bearing provides axial support for the rotor 12 in a manner to be explained hereinafter. As shown in FIG. 2, grooves 42 are formed in a radially extending thrust surface 44 of magnet 16, and the grooves 42 extend from the outer periphery of magnet 16 to a land 45 at the center portion of the magnet 16. Grooves 42 are generally radially extending and are preferably spiral shaped. The grooves 42 enable the magnet 16 to function as one part of a thrust bearing for rotor 12. Coil 30, which has a radially extending planar bearing surface 49 positioned opposite surface 44, functions as the other part of the thrust bearing.

When a current is supplied to coil 30, rotation of magnet 16 causes movement of air between surface 44 and surface 49 in a direction transverse to the grooves 42. Since the resistance to air flow is less along the grooves 42 than it is across the grooves, flow is induced along the grooves 42. Capillary blockage of the induced flow causes the pressure in the air gap between surfaces 44 and 49 to rise above ambient pressure. The pressure gradient is in a direction normal to the direction of relative motion between surface 44 and surface 49. It is the viscous pumping action of the bearing, formed by surfaces 44, 49, and grooves 42, that enables it to support a dynamic load along the axis of rotation of rotor 12. The axial movement of rotor 12 due to the axial force of the air bearing is relatively small. It has been determined, for example, that maximum stability of the rotor 12 is achieved when the axial movement of rotor 12 is about 0.0004 inch. This axial movement of rotor 12 also determines the air gap between magnet 16 and coil 30, and a gap of 0.0004 inch is well within the limits necessary for optimum performance of the motor.

The design of grooves 42 can be either "in pump," in which the flow of air is radially inward, or "out pump" in which the flow is radially outward. The direction of air flow is determined by the direction of rotation of magnet 16 and by the orientation of the grooves 42, including the location of the grooves relative to the boundaries of the magnet 16. With the grooves 42 arranged as shown in FIG. 2 and with magnet 16 rotating in a counterclockwise direction, the air flow will be radially inward, as indicated by arrows 51 in FIG. 1. When the air reaches spindle 18, it is exhausted through an annular space 50 which is shown relatively large for purposes of illustration, but is actually the normal clearance between spindle 18 and polygon 14. The air could also be exhausted through axially-extending grooves (not shown) on either spindle 18 or polygon 14. It is also contemplated that, to achieve radial stability under some operating conditions, herringbone grooves (not shown) could be formed on spindle 18. Although the present invention has been described herein as using air as the fluid which exerts an axial force on rotor 12, it will be apparent that other fluids, such as oil, could be used in practicing the invention.

Figure 3:
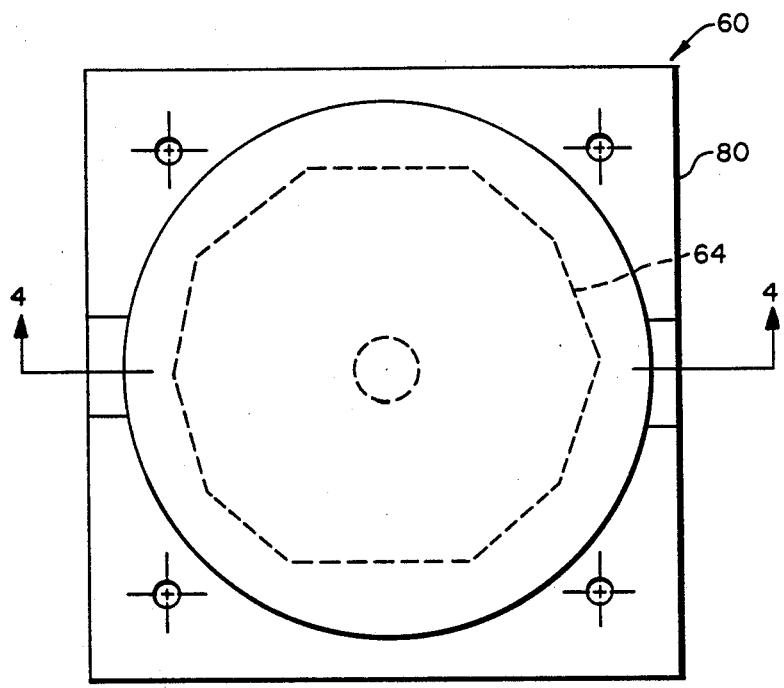
FIG. 3 is a top plan view of a second embodiment of the present invention.
Figure 4:
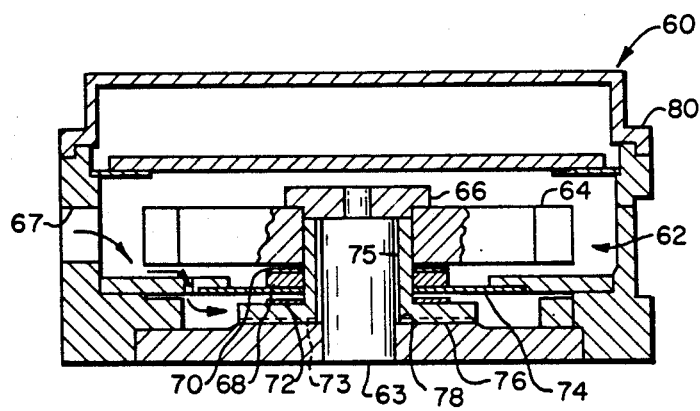
FIG. 4 is an elevational view, with parts shown in section, of the second embodiment of the present invention.

With reference to FIGS. 3 and 4, there is shown a second embodiment of the present invention. As shown in FIG. 4, a rotary device is in the form of an optical scanner 60 which comprises a rotor 62 which is movable on a spindle 63. Rotor 62 includes a polygon 64 which is supported on a sleeve 66. As polygon 64 is rotated, a light beam directed onto the polygon 64 through a window 67 will be scanned across a receiving medium (not shown). Carried on sleeve 66 are a permanent magnet 68 and flux plates 70 and 72. Magnet 68 is adapted to interact with a stationary coil 74 to drive rotor 62 in the manner described above for scanner 10 (FIG. 1). Sleeve 66 comprises a planar thrust surface 76 having radially extending grooves 73 formed therein which function in the manner described previously for grooves 42. Air from grooves 73 is exhausted along an annular space 75 between spindle 63 and sleeve 66. When a current is supplied to coil 74 to drive rotor 62, air drawn in between surface 76 and a planar bearing surface 78 on a housing 80 serves to support rotor 62 in an axial direction. Although no means is shown for supporting rotor 62 at rest, it will understood that a roller bearing (not shown) similar to bearing 40 in scanner 10 could be incorporated in scanner 60. Further, other axial support means could be used, for example, a magnetic device adapted to exert an axial force on rotor 62 when rotor 62 is first moved from a rest position and when rotor the 62 is being returned to the rest position.

The invention has been described in detail with particular reference to certain embodiments thereof, but it will be understood that variations and modifications can be effected within the spirit and scope of the invention. Thus, although the rotary device of the present invention has been described with reference to optical scanners which utilize a polygon, it will be apparent that the invention can be used in a scanner (not shown) in which a hologon is the scanning element. The present invention could also be used in a rotary device (not shown) in which an information bearing element is the driven element, for example, a rotary device in which an optical disk is the driven element, or a rotary device in which the driven element is a magnetic storage element such as a floppy disc.

I claim:

1. A rotary device comprising:
   a rotor which comprises a first element of a planar motor, said rotor including a radially-extending thrust surface;
   means for supporting said rotor for rotational movement, said supporting means including a second element of a planar motor, one of said elements being a printed motor coil and the other element being a generally planar multipolar permanent magnet which is adapted to interact with a field produced by said coil to drive said rotor, said supporting means having a radially-extending bearing surface arranged opposite said thrust surface; and
   means on one of said radially-extending surfaces for receiving a fluid upon rotation of said rotor and for controlling said fluid such that the fluid exerts an axial force on the rotor of a magnitude sufficient to displace said rotor in an axial direction.

2. A rotary device, as defined in claim 1, wherein said first element is a magnet.

3. A rotary device, as defined in claim 1, wherein said second element is a motor coil.

4. A rotary device, as defined in claim 1, wherein said means for receiving and controlling a fluid comprises spiral grooves formed in said one radially-extending surface.

5. A rotary device, as defined in claim 4, wherein said grooves are formed in said radially-extending thrust surface.

6. A motor comprising:
   a stator having a generally planar coil;
   a rotor having a multipolar permanent magnet arranged to interact with a rotary field produced by said coil, said rotor having a radially extending surface arranged opposite said stator, and said surface having a plurality of generally radially-extending grooves formed therein for receiving a fluid upon rotation of said rotor and for controlling said fluid such that the fluid exerts an axial force on the rotor of a magnitude sufficient to displace the rotor in an axial direction.

7. A motor, as defined in claim 6, wherein said surface is on said magnet.

8. A motor, as defined in claim 6, wherein said motor comprises a spindle, said rotor includes a sleeve mounted on said spindle, and said surface is on said sleeve.

9. A motor, as defined in claim 8, wherein said magnet is on said sleeve.

10. A motor comprising:
- a generally planar first element having a planar coil and a first radially extending surface;
- a generally planar second element which includes a generally planar multipolar permanent magnet and a second radially extending surface opposite said first surface;
- means for supporting said elements for rotation relative to each other about an axis; and
- groove means on one of said surfaces for receiving a fluid and for controlling said fluid to exert an axial force on said radially-extending surfaces upon rotation on one of said elements, said force being in a direction and of a magnitude sufficient to move said elements away from each other.

* * * * *